US007558886B2

(12) United States Patent
Allen et al.

(10) Patent No.: US 7,558,886 B2
(45) Date of Patent: Jul. 7, 2009

(54) METHOD AND APPARATUS FOR CONTROLLING DATA FLOWS IN DISTRIBUTED STORAGE SYSTEMS

(75) Inventors: James Patrick Allen, Austin, TX (US); Matthew Joseph Kalos, Tucson, AZ (US); Thomas Stanley Mathews, Austin, TX (US); George Oliver Penokie, Rochester, MN (US); Lance Warren Russell, Rosanky, TX (US); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 11/109,089

(22) Filed: Apr. 19, 2005

(65) Prior Publication Data

US 2006/0235990 A1 Oct. 19, 2006

(51) Int. Cl.
G06F 3/00 (2006.01)
G06F 15/16 (2006.01)
G06F 11/00 (2006.01)
G01R 31/08 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. ............................ 710/29; 710/19; 709/232; 709/235; 370/231

(58) Field of Classification Search .................. 710/29, 710/19; 370/231; 709/232, 235
See application file for complete search history.

(56) References Cited

U.S. PATENT DOCUMENTS

| 6,157,967 | A  | * | 12/2000 | Horst et al. ................... 710/19 |
| 6,167,029 | A  | * | 12/2000 | Ramakrishnan ............. 370/235 |
| 6,345,368 | B1 | * | 2/2002  | Bergsten ...................... 714/11 |
| 6,816,465 | B1 | * | 11/2004 | Barsoum et al. ............ 370/252 |
| 7,010,586 | B1 | * | 3/2006  | Allavarpu et al. ........... 709/223 |
| 7,046,627 | B1 | * | 5/2006  | Dejanovic et al. .......... 370/230 |
| 7,190,669 | B2 | * | 3/2007  | Banerjee ..................... 370/229 |
| 7,209,445 | B2 | * | 4/2007  | Miller et al. ................ 370/235 |

(Continued)

FOREIGN PATENT DOCUMENTS

JP        62106542 A   *   5/1987

OTHER PUBLICATIONS

IBM Research Disclosure, v41, n413, Sep. 1998, Article 413128, "Architecture and Apparatus for Implementing Flow Control in an Ethernet Adapter".*

(Continued)

*Primary Examiner*—Henry W. H. Tsai
*Assistant Examiner*—Steven G Snyder
(74) *Attorney, Agent, or Firm*—Yee & Associates, P.C.; Matthew W. Baca

(57) ABSTRACT

A method, apparatus, and computer instructions for controlling data flow. A control message is formed for the data flow in response to an event while the data flow is occurring. The control message includes a data type, an action, and a duration. The control message is sent to a receiver data processing system, wherein the receiver data processing system modifies the data flow to the data processing system using the control message.

10 Claims, 3 Drawing Sheets

U.S. PATENT DOCUMENTS

| | | | |
|---|---|---|---|
| 7,221,656 B1 * | 5/2007 | Aweya et al. | 370/252 |
| 7,379,422 B2 * | 5/2008 | Nation | 370/230.1 |
| 2002/0156975 A1 | 10/2002 | Staub et al. | 711/114 |
| 2002/0166026 A1 | 11/2002 | Ulrich et al. | 711/114 |
| 2002/0194523 A1 | 12/2002 | Ulrich et al. | 714/4 |
| 2003/0210651 A1 * | 11/2003 | Tzeng et al. | 370/231 |
| 2004/0148484 A1 * | 7/2004 | Watanabe et al. | 711/170 |
| 2006/0203725 A1 * | 9/2006 | Paul et al. | 370/229 |

OTHER PUBLICATIONS

IBM Technical Disclosure Bulletin, v37, n4B, Apr. 1994, p. 575.576, "Flow Control for a Multimedia Distributed Client Server".

IBM Technical Disclosure Bulletin, v40, n8, Aug. 1997, p. 99-100, "Improved Communication Between Multiple Processes".

IBM Technical Disclosure Bulletin, v38, n8, Aug. 1995, p. 507-508, "Use of Queueing Delay for Data Transmission Flow Control".

* cited by examiner

METHOD AND APPARATUS FOR CONTROLLING DATA FLOWS IN DISTRIBUTED STORAGE SYSTEMS

BACKGROUND OF THE INVENTION

1. Technical Field

The present invention relates generally to an improved data processing system and, in particular, to a method and apparatus for controlling data flow. Still, more particularly, the present invention relates to a method, apparatus, and computer instructions for controlling data flows in distributed storage systems.

2. Description of Related Art

Over the last several years, significant changes have occurred on how persistent storage devices are attached to computer systems. With the introduction of Storage Area Networks (SANS) and Network Attached Storage (NAS) technologies, storage devices have evolved from locally attached, low capability, passive devices to remotely attached, high capability, active devices that are capable of deploying vast file systems and file sets. (These remotely attached intelligent storage devices are referred to as "storage servers". The computer system to which they are attached is referred to as the "host").

But as the storage infrastructure becomes more distributed and intelligent, it becomes much more difficult to coordinate the actions of the disparate systems. In particular, controlling data flows through the system is problematic. For example, the storage server may want to hold off data transmissions of a particular type from the host while it does some critical functions, such as synchronizing the state of its components and synchronizing the state of the data. Today's state-of-the art is that the storage server simply tells the host it is "busy". This "busy" state is really the most primitive of flow control mechanisms. While the storage server is "busy" the host cannot send data. The host waits until the "busy" is turned off by the storage server and then resumes data transmission.

Problems arise because the host cannot tell if the storage server is really busy or dead. In the busy interval, the host is receiving application requests to access the storage serviced by the storage server. These requests cannot be held indefinitely so the host waits a certain amount of time and then assumes the storage server is dead. The amount of time that the host waits and the amount of time the storage server can be busy is not coordinated so erroneous assumptions about the state of the storage server at the host occur. This situation causes the host to fail data transfers that it should not. These failures, in turn, cause host applications, such as file systems, data bases and logical volume managers, to make erroneous assumptions about the state of the storage. All of the above cause severe recovery problems throughout the storage software stack when the "dead" storage server comes back to life.

Thus, it would be advantageous to have an improved method, apparatus, and computer instructions for controlling data flows in a distributed storage system, such as those between hosts and storage servers.

SUMMARY OF THE INVENTION

The present invention provides a method, apparatus, and computer instructions for controlling data flow. A control message is formed for the data flow in response to an event while the data flow is occurring. The control message includes a data type, an action, and a duration. The control message is sent to a receiver data processing system, wherein the receiver data processing system modifies the data flow to the data processing system using the control message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
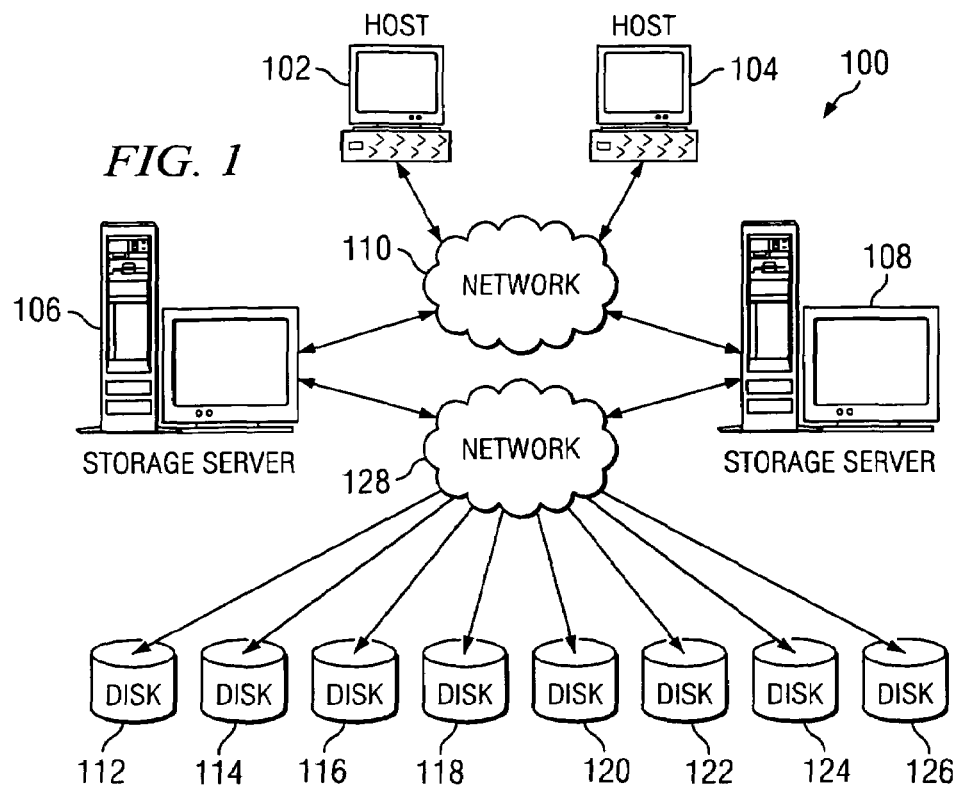
FIG. 1 is a network data processing system depicted in accordance with an illustrative embodiment of the present invention.

With reference now to the figures and, in particular, with reference to FIG. 1, a network data processing system is depicted in accordance with an illustrative embodiment of the present invention. Network data processing system 100 takes the form of a distributed storage system that contains one or more host systems, one or more storage servers connected to persistent storage devices, and an internal network interconnecting the host systems to the storage servers.

In this particular example, network data processing system 100 contains host 102, host 104, storage server 106, and storage server 108. These components are interconnected by each other through network 110. Network 110 may take various forms depending on the particular implementation. For example, network 110 may include connections, such as wire, rows communication links, or fiber optic cables. Network 110 may be, for example, a local area network (LAN), a wide area network (WAN), an intranet, or even the Internet depending on the particular implementation.

Storage server 106 and storage server 108 are connected to disk 112, 114, 116, 118, 120, 122, 124, and 126 through network 128. In this illustrative example, network 128 takes the form of a fiber channel network. Of course, other types of networks may be used as interconnects.

The mechanism of the present invention in these illustrative examples is independent of the physical network media connecting the different components illustrated in FIG. 1. For example, all of the fiber channel networks may be replaced with Ethernet networks. The illustrative example in FIG. 1 is intended as an example, and not as an architectural limitation for the present invention.

Figure 2:
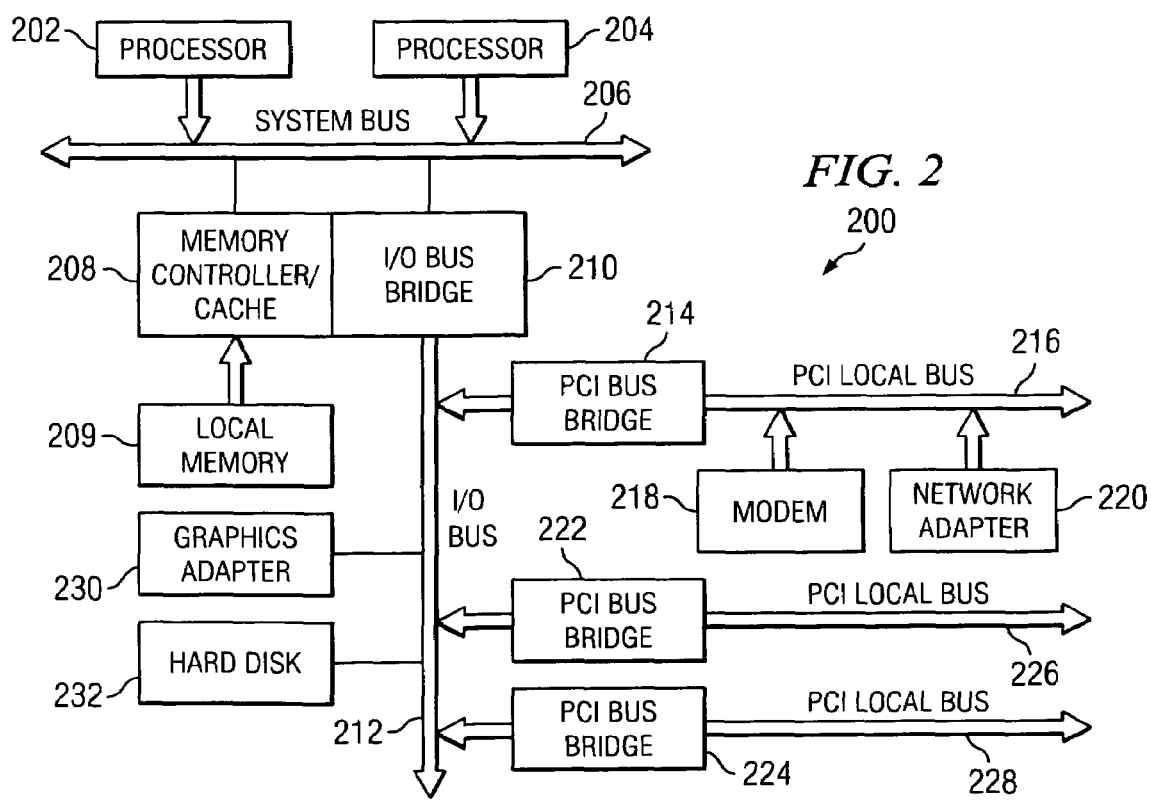
FIG. 2 is a block diagram of a data processing system that may be implemented as a server depicted in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The present invention provides a method, apparatus, and computer instructions for managing data flows between two end points, such as a host system and a storage server in these illustrative examples. The mechanism of the present invention allows information to be interchanged between a host and a storage server to manage the data flow between those components. A data flow control is used in these illustrative examples to provide the exchange of information for controlling or coordinating data flows. A control may be initiated by a host system and/or by a storage server in these illustrative examples. In this manner, a host is able to determine whether a storage server is actually busy or dead.

Figure 3:
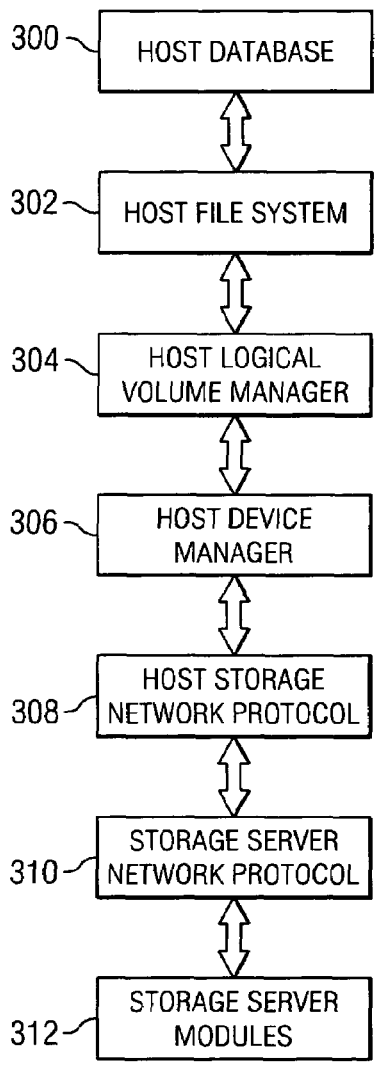
FIG. 3 is a diagram illustrating components in a data flow between a host and a storage server depicted in accordance with an illustrative embodiment of the present invention.

With reference now to FIG. 3, a diagram illustrating components in a data flow between a host and a storage server is depicted in accordance with an illustrative embodiment of the present invention. In this illustrative example, an application, such as host database 300, execute on host systems, such as host 102 or host 104 in FIG. 1. This application accesses virtualized storage pools. These storage pools are constructed by host systems using file systems and/or logical volume managers. These storage pools are physically backed by actual storage resided on one or more storage servers, such as those illustrated in FIG. 1.

Host database 300 issues input and output requests to the storage pools. These requests are passed through host logical volume manager 304 to host device manager 306. These requests are then converted into an appropriate form through storage network protocol 308 and transmitted over a network to an appropriate storage server module in storage server modules 310 to satisfy the request. Storage server modules 310 are the software components that process requests from a host to access data in a persistent storage, such as disk 112 in FIG. 1. These modules generate the appropriate commands needed to read and write data in the physical disks associated with the storage server. An example of a protocol that may be implemented in storage network protocol 308 is an ISCSI protocol as specified in RFC 3347 or a fiber channel protocol as specified in ANSI standards. These protocols define the mechanism by which hosts and storage servers communicate. In these examples, the pipeline for the data flow includes host file system 302, host logical volume manager 304, host device manager 306, host storage network protocol 308, storage server network protocol 310, and storage server modules 312.

Figure 4:
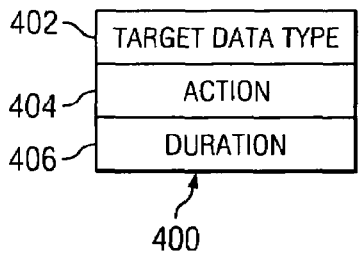
FIG. 4 is a diagram illustrating a control depicted in accordance with an illustrative embodiment of the present invention.

The mechanism of the present invention includes a software interface that is provided between hosts and storage servers. In this illustrative embodiment, the interface is implemented within a storage network protocol, such as host storage network protocol 308 or storage server network protocol 310. These interfaces permits a host and storage server to exchange data flow control. A control can be issued by either the host and/or storage server in these illustrative examples. With reference now to FIG. 4, a diagram illustrating a control is depicted in accordance with an illustrative embodiment of the present invention. Control 400 contains three logical parts in this example. These parts include target data type 402, action 404, and duration 406. Target data type 402 is used to identify the data that is the target of the control. Typically, this target data type is all of the data transferred between the host and storage server. Target data type 402, however, may be more restrictive to allow the target of the control to be a limited data type, such as just reads, writes, or data within certain offsets.

Action 404 in control 400 is used to identify the action that the initiator wants the receiver to take on the control data target. Typically, this action is to hold all data flows designated by target data type 402. However, other actions may be used in the illustrative examples. For example, the action may involve halting data flows of the designated type after a limit or threshold has been reached or exceeded. Duration 406 is used to identify the amount of time that the initiator wants the control to be in effect.

In one example, application host database 300 opens a file and issues a write of a specific length at specific offset to host file system 302. Host file system 302 converts the write into a logical volume request and forwards this request to host logical volume manager 304. In turn, host logical volume manager 304 converts the write to a physical device request and forwards this request to host device manager 300. Host device manager 300 converts the request to the proper protocol and contacts the storage server over a network. In these examples, the protocol is one for the specific storage network, such as storage network protocol 308. This request is then received at the storage server by storage server modules 310. These modules interpret and process the request. The data is written to the persistent storage and a success or failure is returned to host database 300.

The interface in these examples allows for both the setting and querying of a control. In these examples, querying is performed by the receiver of the control to obtain an update on duration of the control and to verify that the control initiator is still alive. The querying is typically performed by a host. The setting of a control allows a sender of a control, such as a storage server, to specify what actions may be taken upon different types of data for a particular duration.

The exchange of the duration in a control coordinates data flows between a host and storage server. The receiver of a control knows precisely how long a flow control condition lasts. The ability to query the control adds an additional flexibility of verifying the responsiveness of the initiator.

Figure 5:
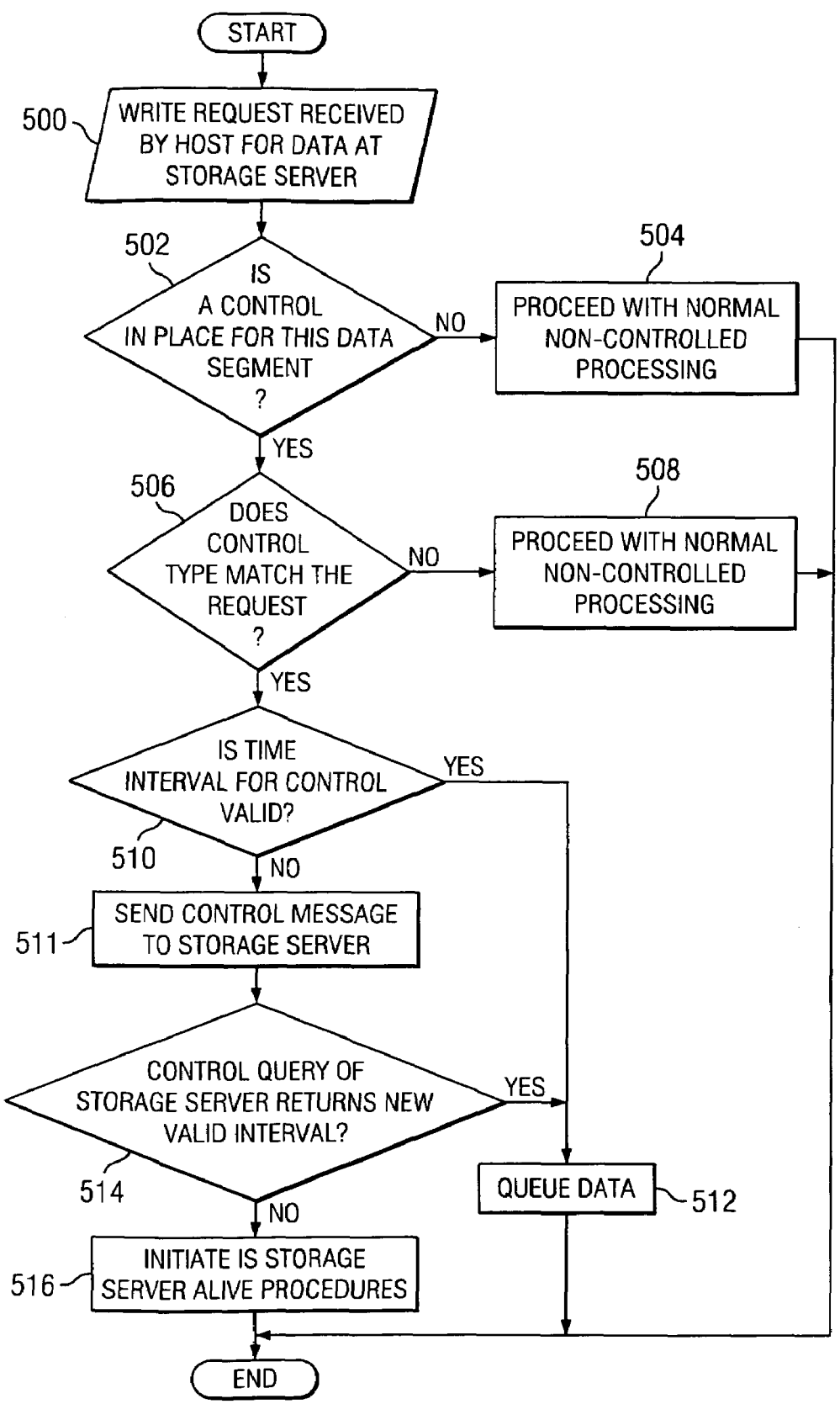
FIG. 5 is a flowchart of a process for handling a control on a host depicted in accordance with an illustrative embodiment of the present invention.

Turning now to FIG. 5, a flowchart of a process for handling a control on a host is depicted in accordance with an illustrative embodiment of the present invention. The process illustrated in FIG. 5 may be implemented in a host, such as host 102 in FIG. 1.

The process begins by receiving a write request for data at a storage server (step 500). This request may be received from an application, such as host database 300 in FIG. 3. Next, a determination is made as to whether a control is in place for this data segment that is to be written (step 502). If a control is not in place for this data segment, the process proceeds to normal non-controlled processing (step 504) with the process terminating thereafter.

Otherwise, a determination is made as to whether the control type matches the request received in step 500 (step 506). This control type is identified from a target data type in a control received by the host in these examples. If the control type does not match the request, the process proceeds with normal non-controlled processing of the request (step 508) with the process terminating thereafter. This type of processing is the processing of data that currently occurs without the control mechanism of the present invention.

Otherwise, a determination is made as to whether the time interval for the control is valid (step 510). In other words, a determination is made as to whether the duration indicated by the control has expired. If the duration has not expired, the data is queued for later processing (step 512) with the process then terminating thereafter. In this example, the data is queued in the host and transmitted when the control expires. This processing occurs when the duration for the control has expired and the storage server is available to process data. If the time interval for the control is not valid, a control message is sent to query the storage server (step 511). Next, a determination is made as to whether a query of the storage server returns a new valid interval (step 514). The recipient of a query control can adjust the duration of a control up or down. Typically, the control is adjusted downward. The recipient determines the valid interval, but an understanding is present that if the duration is too long, I/O requests may fail. If a new valid interval is returned by the storage server, the process proceeds to step 512 as described above to keep the data for later processing. On the other hand, if a new valid interval is not returned, storage server alive procedures are initiated (step 516) with the process terminating thereafter. In determining whether the storage server is alive, the control query may be resent up to some maximum number of retries, such as three. If after these retries, a valid response is not received, then the storage server is assumed or declared to be dead. This situation stops all host I/O to the storage server and usually requires some administration action to make the host reactivate I/O with the server.

Figure 6:
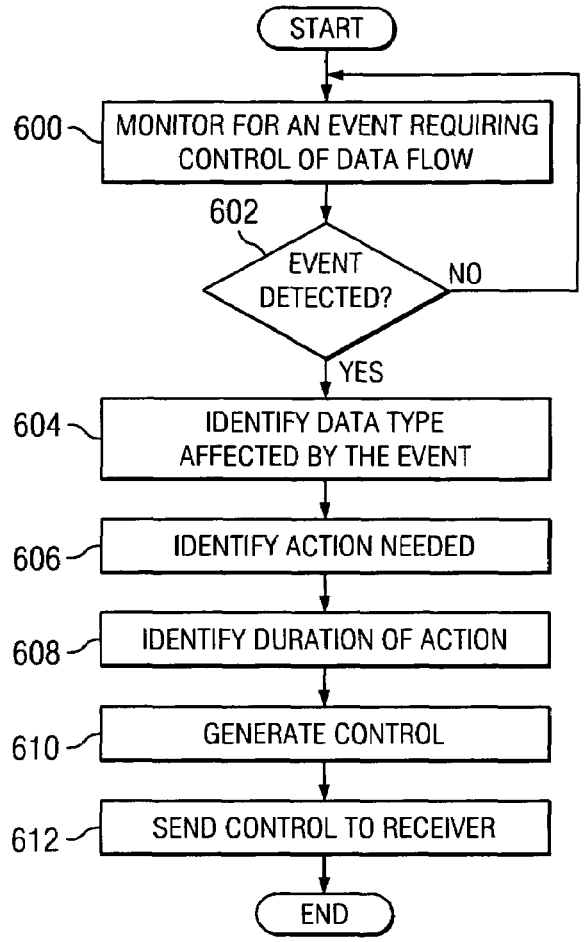
FIG. 6 is a flowchart of a process for generating a control depicted in accordance with an illustrative embodiment of the present invention.

With reference now to FIG. 6, a flowchart of a process for generating a control is depicted in accordance with an illustrative embodiment of the present invention. The process illustrated in FIG. 6 may be implemented in a data processing system, such as storage server 106 in FIG. 1.

The process begins by monitoring for an event requiring a control of data flow between the storage server and a host (step 600). Next, a determination is made as to whether such an event has been detected (step 602). In these examples, a number of different events may require the generation of a control. For example, a critical function may be initiated on a storage server, such as synchronizing the state of components in the storage server or synchronizing the state of data. An example of other events that may require generation of a control by a storage server includes data that is being migrated or copied from one physical device to another with the storage server wanting to quiescence I/O while this process is being set up. In another example, capacity limits are breeched, and the storage server wants to restrict I/O while new capacity is being brought online. In another example, a higher priority processing takes precedence. The process returns to step 600 until such an event has been detected. When an event has been detected, the data type affected by the event is identified (step 604). The action needed is identified (step 606), and a duration of the action is identified (step 608). Based on the identifications made in step 604, step 606, and step 608, a control is generated (step 610). This control is then sent to a receiver, such as a host in the data flow (step 612) with the process terminating thereafter.

Figure 7:
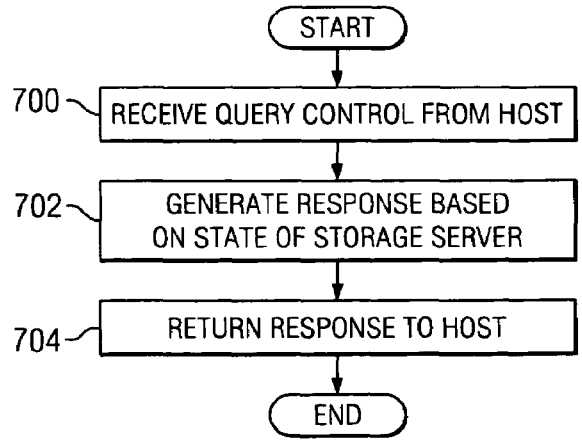
FIG. 7 is a flowchart of a process for processing a query from a host depicted in accordance with an illustrative embodiment of the present invention.

With reference to FIG. 7, a flowchart of a process for processing a query from a host is depicted in accordance with an illustrative embodiment of the present invention. The process illustrated in FIG. 6 may be implemented in interface located in a storage network protocol, such as storage network protocol 308 in FIG. 3. The process begins by receiving a query control from a host (step 700). Thereafter, a response is generated based on the state of the storage server (step 702). In generating a response, control durations are estimates of how long a control should be in place. As a control takes effect and the processing which caused the control proceeds, the duration estimate can be updated with more precision. Queries allow this information to be conveyed to the target of the control. Queries also provide a mechanism for the initiator of the control to tell an impatient target that "yes I am alive and hold on for this new duration". Queries may also update a limit (always upward) that was set by the first control. This response is then returned to the host (step 704) with the process terminating thereafter.

Thus, the present invention provides an improved method, apparatus, and computer instructions for controlling data flows between two end points, such as a host and storage server. The mechanism of the present invention generates a control message for the data flow in response to some event occurring while data flow is present between the two end points. The control message is typically sent to the host, wherein the host modifies the data flow based on the content of the control message. In this manner, more specific indications other than just the storage server being busy may be provided. The mechanism of the present inventions allows for a duration to be identified as well as the types of data affected and the actions to be taken in response to the control. This control allows a host to identify whether a storage server is really busy or is dead or otherwise unavailable. In this manner, loss of data and severe recovery problems may be avoided because erroneous assumptions of the state of the storage server are avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for controlling data flow, the method comprising:

monitoring a data flow between a host data processing system and a storage data processing system for an event requiring a control of the data flow;

responsive to detecting an event requiring a control of the data flow, an initiator one of the host data processing system and the storage data processing system forming a control message for the data flow, wherein the control message includes an identified data type that is affected by the event, an identified action to be taken with respect to the identified data type, and an identified time duration for the identified action to be in effect, wherein the identified action to be taken with respect to the identified data and the identified time duration for the identified action to be in effect are specified by the initiator one of the host data processing system and the storage data processing system;

the initiator one of the host data processing system and the storage data processing system sending the control message to a receiver one of the host data processing system and the storage data processing system, wherein the receiver one of the host data processing system and the storage data processing system modifies the data flow by taking the identified action with respect to the identified data type that is affected by the event for the identified time duration specified in the control message; and the receiver one of the host data processing system and the storage data processing system querying the initiator one of the host data processing system and the storage data processing system for obtaining an update on the identified time duration for coordinating the data flow, and for verifying responsiveness of the initiator one of the host data processing system and the storage data processing system.

2. The method of claim 1, wherein the identified action is to halt transmission of the identified data type.

3. The method of claim 1, wherein the identified action is to halt or limit transmission of the identified data type after a threshold has been reached.

4. The method of claim 1, wherein the initiator one of the host data processing system and the storage data processing system is the storage data processing system, and wherein the receiver one of the host data processing system and the storage data processing system is the host data processing system.

5. The method of claim 4, wherein the event is an occurrence of a critical function in the storage data processing system.

6. The method of claim 1, wherein the initiator one of the host data processing system and the storage data processing system is the host data processing system, and wherein the receiver one of the host data processing system and the receiver data processing system is the storage data processing system.

7. The method of claim 1, wherein the event is a receipt of a request to initiate control of the data flow.

8. The method of claim 1, wherein the event is an inability to further process data of the identified data type by the storage server.

9. The method of claim 1, wherein the identified data type comprises one of all data being transferred, reads, writes and data within certain offsets.

10. A method in a data processing system for controlling data flow, the method comprising:

monitoring a data flow between a host data processing system and a storage data processing system for an event requiring a control of the data flow wherein the event comprises one of a synchronizing of a state of components, a synchronizing of a state of data, a copying of data from one physical device to another physical device or a breech of a storage capacity limit;

responsive to detecting an event requiring a control of the data flow, an initiator one of the host data processing system and the storage data processing system forming a control message for the data flow, wherein the control message includes an identified data type that is affected by the event, the identified data type being one of all data to be transferred or a limited type of the data to be transferred, an identified action to be taken with respect to the identified data, the identified action being one of limiting or halting data flow after a threshold has been reached, and an identified time duration for the identified action to be in effect, wherein the identified action to be taken with respect to the identified data and the identified time duration for the identified action to be in effect are specified by the initiator one of the host data processing system and the storage data processing system;

the initiator one of the host data processing system and the storage data processing system sending the control message to a receiver one of the host data processing system and the storage data processing system;

the receiver one of the host data processing system and the storage data processing system modifying the data flow by taking the identified action with respect to the identified data type affected by the event for the identified time duration specified in the control message; and the receiver one of the host data processing system and the storage data processing system querying the initiator one of the host data processing system and the storage data processing system for obtaining an update on the identified time duration for coordinating the data flow, and for verifying responsiveness of the initiator one of the host data processing system and the storage data processing system.

* * * * *